A. DESCHAMPS.
SUSPENSION MEANS FOR MOTOR CARS.
APPLICATION FILED AUG. 18, 1919.

1,416,797.

Patented May 23, 1922.

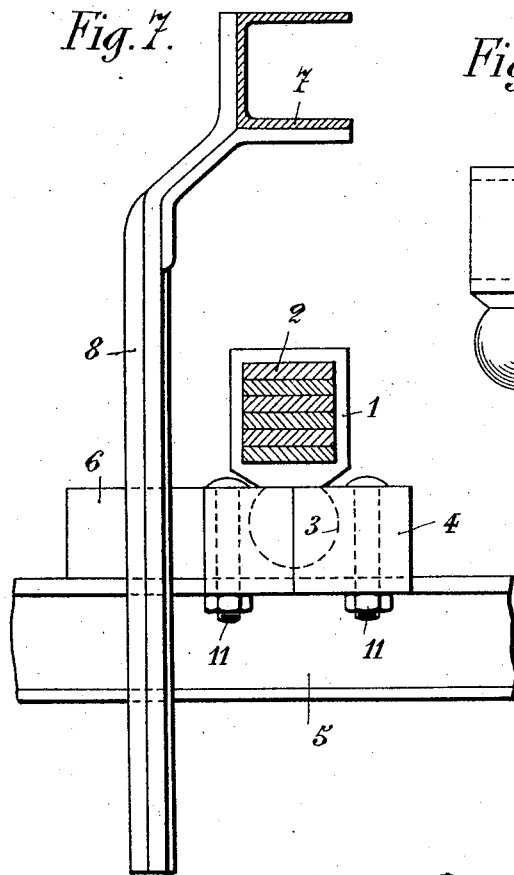
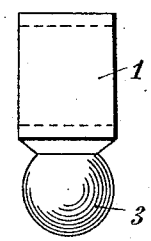
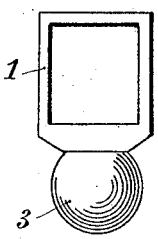
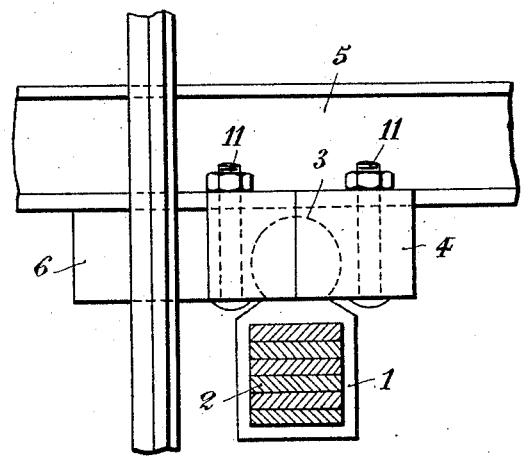

A. DESCHAMPS.
SUSPENSION MEANS FOR MOTOR CARS.
APPLICATION FILED AUG. 18, 1919.
1,416,797.
Patented May 23, 1922.
4 SHEETS—SHEET 3.
Fig. 11. Fig. 12.
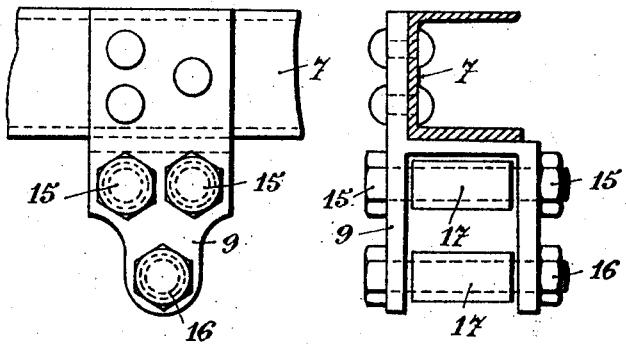
Fig. 13. Fig. 14.
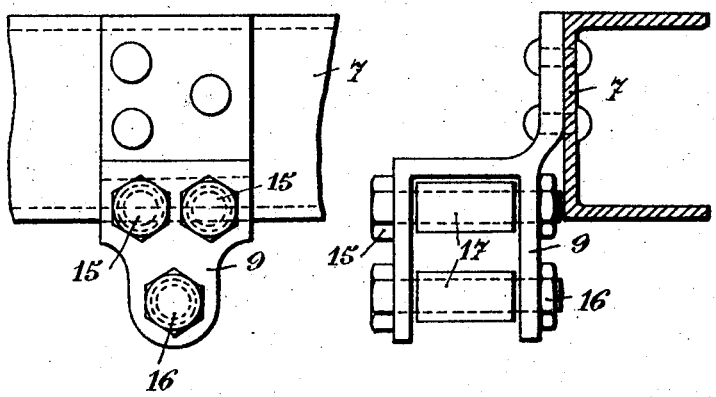
Fig. 15. Fig. 16.
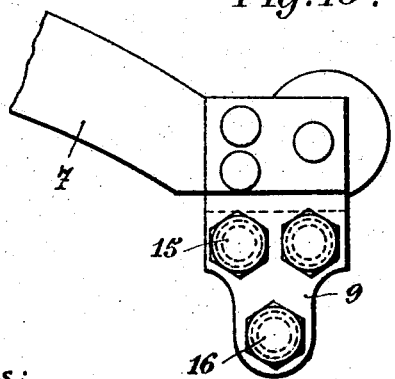 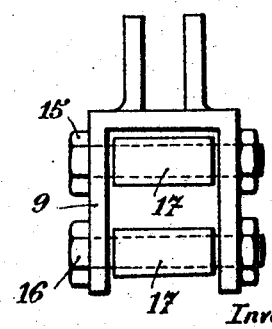
Witnesses:
Inventor

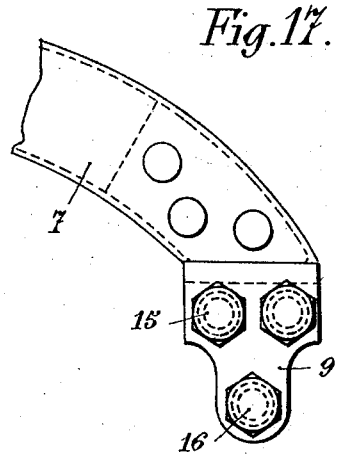
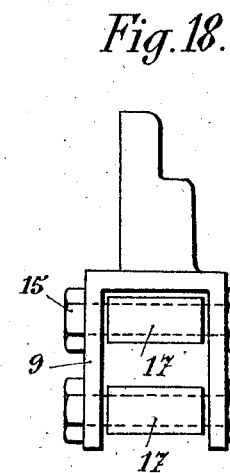
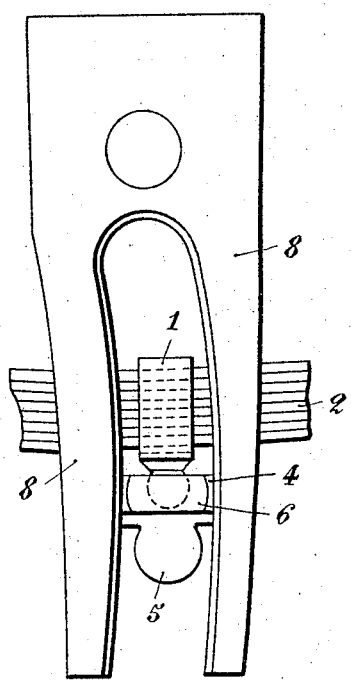

UNITED STATES PATENT OFFICE.

ALBERT DESCHAMPS, OF PARIS, FRANCE.

SUSPENSION MEANS FOR MOTOR CARS.

1,416,797. Specification of Letters Patent. Patented May 23, 1922.

Application filed August 13, 1919. Serial No. 318,403.

(GRANTED UNDER THE PROVISIONS OF THE ACT OF MARCH 3, 1921, 41 STAT. L., 1313.)

*To all whom it may concern:*

Be it known that I, ALBERT DESCHAMPS, of Paris, France, have invented certain new and useful Suspension Means for Motor Cars, (for which I have filed an application in France August 1st, 1918, Patent No. 498,100,) of which the following is a specification.

This invention relates to suspension means for motor cars.

In the usual motor car springs, the eyes of the springs are secured at one end directly on the dumb-irons of the chassis and at the other to the shackles of the suspension supports, so as to be able to pull and push the wheel axles, on which they are fixed at their centre by bolted coupling plates.

This arrangement of attachment subjects the springs in certain cases to simultaneous strains of pressure, traction and flexion.

Examples:—

1. When the motor is set in motion and engages the gearing of the back bridge, the wheel axle under the strain makes a movement of recoil and the part of the spring fixed directly on the axle undergoes a tractional strain, then in consequence of the adhesion of the tire to the ground a reaction is produced and the spring then undergoes a pressure strain which pushes the vehicle forward; these strains are almost simultaneous and are produced at each displacement of the vehicle.

When the wheels encounter an obstacle due to the irregularities of the ground, the axle, on receiving the shock, is subjected to a more or less accentuated recoil movement according to the size of the obstacle and the motor continuing to work for resuming its forward movement and flexion strains for deadening the shock: these various strains being almost simultaneous, the result is that the flexions of the spring are disordered, do not synchronize and do not take the amplitude required to deaden the shock: part of the strains is transmitted direct by the springs to the shafts which are to absorb it in the shape of vibrations.

2. When one wheel only encounters an obstacle the spring on that side suddenly bends under the shock, drawing with it the chassis, then, under the reaction, communicates to it a series of vertical and transverse oscillations until the total absorption of the shock: the plates of the spring are then during the whole duration of the oscillations subjected at their ends to torsion strains which cause the rupture of the spring plates and coupling plates.

3. When the wheels are no longer in the same plane, especially in turning, the end attachments, even when they are conected by shackles to the dumb-irons, always form articulations insufficient to allow the springs to assume through a curved path the angular position proportional to the displacement of the chassis in relation to the wheel axle: the central attachments fixing the springs on the axles being rigid, prevent any displacement of the springs on the axles during the passage through the curve, which results in resistance of the spring on the axle creating centrifugal force, which is transmitted by the coupling-plates as far as the ends of the plates of the springs.

The distance apart of the coupling-plates always constitutes, in proportion to these dimensions, a lever which develops said centrifugal force which subjects the plates of the springs to torsional and transverse strain possibly causing them to break.

Owing to the different functions of the springs which in turn draw and push the wheel axles, they have to be constructed with plates of unequal thickness, the main plate having always to be very thick in order to resist the different strains above mentioned: this thickness of the main plate lessens its flexibility which becomes very slight and no longer in relation to the weight of the vehicle: in order to compensate this defect, the flexibility of the lower plates is increased by decreasing their thickness: the result of this construction is to give different moments of elasticity for each plate producing lack of synchronism and amplitude of the flexions causing abnormal working of the spring, absorbing the shocks and badly imparting to the vehicle series of irregular and powerful oscillations at every shock received.

The suspension means which forms the object of this invention and the purpose of which is to remedy all these drawbacks comprises:—

(*a*) The application on the chassis of four guide-rails for the wheel axles intended to draw and push them according to the displacements of the vehicle.

(b) The arrangement of supports for the ends of the springs with or without friction rollers, instead of the attachment of the springs by means of eyes directly on the dumb-irons and rendering the latter free to work at flexion only.

(c) The application to the springs of a central coupling plate having a spherical lower part forming a swivel, fitted in a bearing in two parts fixed on the linch-pin of the axle; the swivel of the coupling plate being pivotable in its bearing, allows the spring to be displaced in all directions; one of the ends of said bearing forms a friction member between the branches of the guide-rail fixed on the body.

With this system, the wheel axles, instead of being drawn and pushed by the suspension-springs, are drawn and pushed by the guide-rails which consolidate together the chassis and the axles, whilst still leaving the chassis complete liberty of movement for transverse and vertical oscillations.

In the case (a), the springs having become free in consequence of the omission of their attachments to the dumb-irons and of the articulation of those fixed on the axles, will work only at flexion: the synchronism and the amplitude of the flexions is quite free and will deaden the shock to the maximum extent.

In the case (b), the springs being displaceable by means of their jointed coupling-plate pivoting in its bearing, will follow the displacement of the chassis in its oscillations and will not be subjected to any twisting strain: the reaction will be less owing to the fact that the springs will work with all their power during absorption of the shock and the oscillations will decrease in proportion to the amplitude of the flexions.

In the case of (c), the spherical shape of the coupling-plate bearing, will allow the spring an angular transverse displacement proportional to the displacement of the chassis in relation to the axle, in the curve described in turning: owing to the facility of this displacement, any resistance between the spring and the axle being absent, no centrifugal force will be developed and the defects above mentioned will be obviated.

Owing to the aforesaid advantages, the springs are constructed with plates of equal thickness which, having the same amount of elasticity, will have the same flexibility and will work with synchronizing flexions of the same amplitude.

The annexed drawing shows several examples of construction of the invention.

Figs. 2 and 3 show, in front and side view, a swivel coupling-plate.

Figure 4:
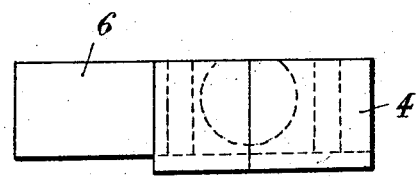
Figure 5:
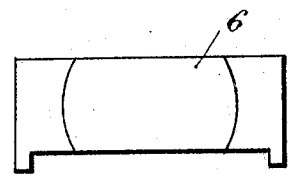
Figure 6:
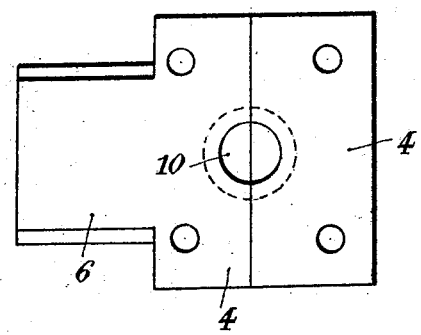

Figs. 4, 5, and 6 are a side view, a front view, and a plan view of the support for the coupling plate.

Fig. 7 shows in side view the swivel coupling-plate, its bearing and the guide-rail for the chassis or body.

Fig. 8 is a horizontal section of the guide-rail.

Fig. 9 illustrates a modification of the mounting of the swivel coupling-plate.

Figure 10:
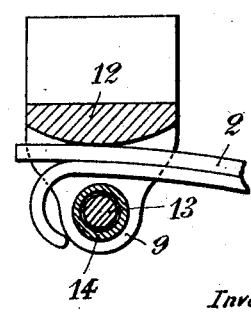

Fig. 10 represents a simplified arrangement of mounting the ends of the spring.

Figs. 11 and 12 show in side view and in front view, an intermediary suspension support for the front springs.

Figs. 13 and 14 represent an intermediary support for the back springs.

Figs. 15 and 16 show a support for the ends of the front springs.

Figs. 17 and 18 represent a support for the end of the back springs.

Fig. 19 illustrates a curved guide for the rear axle.

Figure 1:
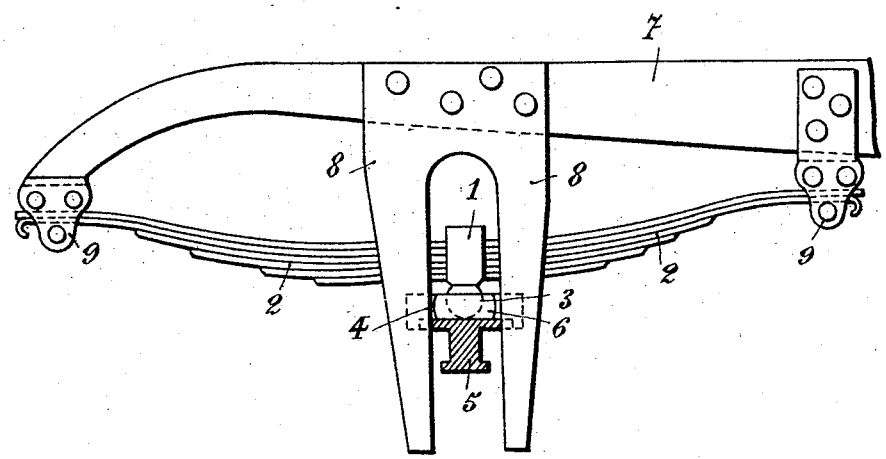
Fig. 1 illustrates the spring suspension in elevation.

The blades of the spring 2 are arranged in a central coupling plate I, confining the blades. The coupling-plate carries a swivel 3 capable of oscillating in a bearing member 4 secured to the axle 5. This bearing forms at one end a friction part 6 engaged between the arms of a guide-rail 8 fixed to the chassis 7 (Figure 1), the ends of the suspension spring 2 are freely engaged in smooth or roller supports 9 secured to the chassis 7.

For facilitating construction, the swivel 3 of each coupling-plate I is housed in a cavity 10 (Figure 6) provided in the bearing formed of two parts 4, which is secured to the axle 5 by means of bolts II (Fig. 7), one end of the bearing member 4 forms the friction parts 6 engaged between the branches of the guide-rail 8 which is secured to the chassis. As shown in Fig. 9, the spring 2 can be arranged under the axle 5 without in any way altering the principle of the invention.

Different kinds of suspension supports can be employed for the ends of the springs which are freely engaged therein.

Also the support shown in Fig. 10 can be used which comprises a rounded part 12 and a lower bolt 13 on which can be arranged if required a tube 14, forming a roller for the spring 2.

Also such supports as those represented in Figs. 11 to 17 can be used which comprise two upper bolts 15 and one lower bolt 16, all three provided with rollers 17.

The back axle 5 (Fig. 19) is mounted on a bearing with a swivel coupling-plate as has been explained for the front axle, the friction part 6 of the bearing 4 is engaged between the branches of the guide 8, these two branches forming a curve having the radius described by the universal shaft at starting from the speed-box: this curve is intended to facilitate the displacement of the chassis in the vertical oscillations.

What I claim as my invention and desire to secure by Letters Patent of the United States is:—

1. A spring suspension for motor cars comprising a leaf spring, means for coupling the leaves of said spring together, a block arranged to be attached to the wheel axle, means connecting said coupling-means to said block allowing said spring to pivot in all directions, an extension on said block, a guide fixed to the car chassis in which said extension can slide and means arranged to freely connect the extremities of the spring to the car chassis.

2. A spring suspension for motor cars comprising a leaf spring, the leaves of which are of equal thickness, a coupling member connecting said leaves together, a spherical member integral with said coupling member, a bearing member in two parts arranged to be attached to the wheel axle of the car and housing said spherical member, an extension on said bearing member, a guide fixed to the car chassis in which said extension can slide, and means arranged to freely connect the extremities of the spring to the car chassis.

3. A spring suspension for motor cars comprising a leaf spring, means for holding the leaves of said spring together, a spherical surface joint arranged to connect the spring with the axle of the car and allowing universal motion of the spring, an extension connected with said joint, and a guide secured to the car frame and in sliding engagement with said extension, and means arranged to connect the ends of the spring with said frame.

In witness whereof I have signed this specification in the presence of two witnesses.

A. DESCHAMPS.

Witnesses:
   Chas. P. Pressly,
   Guiterzon Rolz.